United States Patent [19]

Schreiber

[11] 4,036,449
[45] July 19, 1977

[54] BELT ROLL-UP MECHANISM FOR A SAFETY BELT IN A VEHICLE

[75] Inventor: Winfried Schreiber, Sindelfingen, Germany

[73] Assignee: Daimler-Benz Aktiengesellschaft, Germany

[21] Appl. No.: 610,787

[22] Filed: Sept. 5, 1975

[30] Foreign Application Priority Data

Sept. 6, 1974 Germany .............................. 2442745

[51] Int. Cl.² ........................................... B65H 75/48
[52] U.S. Cl. .................................................. 242/107
[58] Field of Search .................... 242/107 R, 107.4 R; 185/39, 37, 41 A

[56] References Cited

U.S. PATENT DOCUMENTS

| 52,334 | 1/1866 | Smith | 185/37 |
|---|---|---|---|
| 196,503 | 10/1877 | Underhill | 185/37 |
| 3,326,493 | 6/1967 | Bondesen et al. | 242/107.4 R |
| 3,337,155 | 8/1967 | Binding | 242/107 |

Primary Examiner—Harry N. Haroian
Attorney, Agent, or Firm—Craig & Antonelli

[57] ABSTRACT

A belt roll-up mechanism for a safety belt in a motor vehicle, in which the pull-out force required to overcome the force produced by the pull-back device is controlled over the entire pull-out range of the safety belt by at least one shifting member so as to have an essentially constant value or a value decreasing with an increased pull-out length, which value in the maximum case corresponds to the pull-back force effective at the end of a roll-up operation.

12 Claims, 4 Drawing Figures

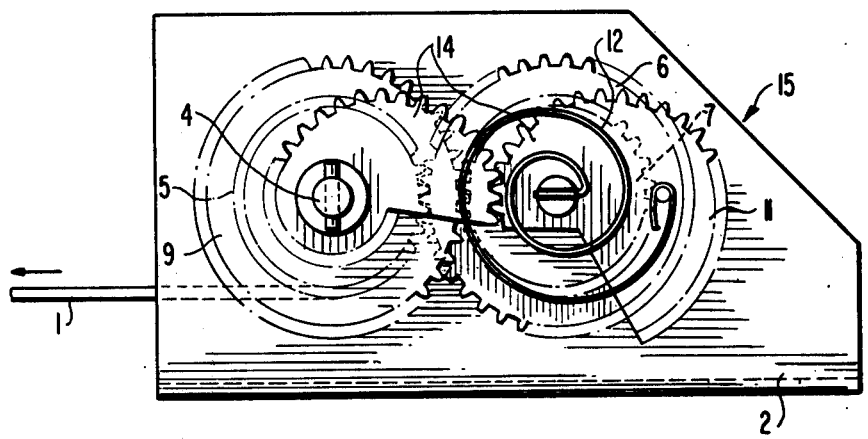
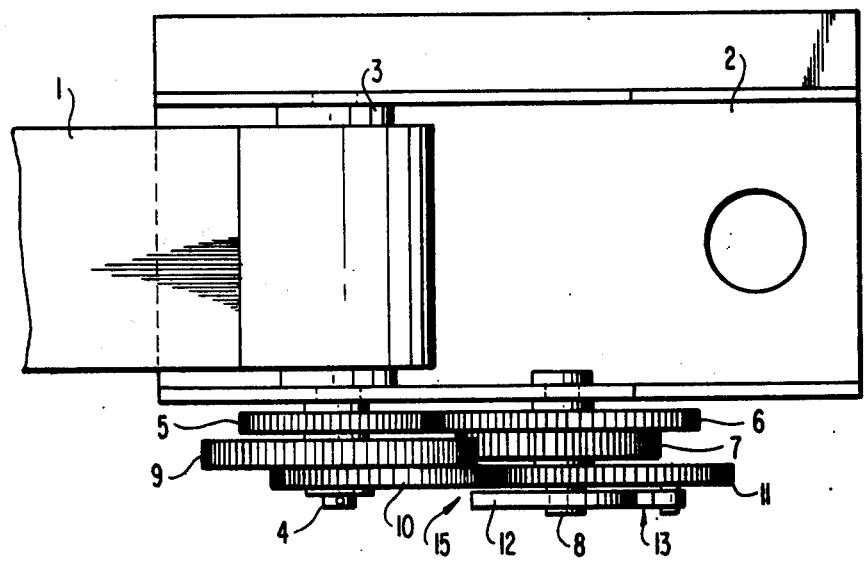

BELT ROLL-UP MECHANISM FOR A SAFETY BELT IN A VEHICLE

The present invention relates to a belt roll-up mechanism for a safety belt in a vehicle, especially in a motor vehicle, whereby the safety belt is acted upon by a pull-back device effective at least during the driving operation.

Such pull-back devices, which as a rule consist of a band spring installed with prestress into the roll-up housing of the belt roll-up mechanism, entail the disadvantage that with an increasing belt-tightening, the pull-back force increases which in case of a fastened belt leads to a disagreeable pressure on the body of the user.

An installation for the reduction of roll-up force is disclosed in the German Offenlegungsschrift No. 2,256,493 which consists, for example, of a brake mechanism operating in dependence on the pulled-out length of the belt band. It is achieved thereby that the roll-up force becomes smaller than the spring force. This installation, however, is of advantage only if the passenger whose safety belt has been fastened, remains on his seat motionless. If, however, the belt user attempts to move forwardly, for example, to remove something out of the glove compartment or if the seat is to be moved forwardly, then in addition to the pull-back force which becomes again fully effective, additionally the applied brake force has to be overcome.

It is the aim of the present invention to provide a belt wind-up or roll-up mechanism which does not entail this disadvantage so that a maximum degree of freedom of movement can be attained. Simultaneously, it is, however, to be assured thereby that after the unfastening of the belt, a complete winding-up or rolling-up thereof does take place.

Consequently, a belt roll-up mechanism for a safety belt in a vehicle, especially in a motor vehicle, is proposed, in which the safety belt is acted upon by a pull-back device effective at least during the driving operation, whereby according to the present invention the pull-out force required to overcome the force developed by the pull-back device, is brought over the entire pull-out range of the safety belt to a constant value or to a value decreasing with increasing pulled-out length by at least one shifting member, which value in the maximum case corresponds to the pull-back force effective at the end of a winding-up or rolling-up operation.

In one embodiment of the present invention, the pull-back device may be constructed as lamellae motor whose rotor is coupled with the belt roller and is acted upon, for example, with a vacuum produced by an internal combustion engine, whereby a sensing device is provided as shifting member which detects the pulled-out length of the safety belt or the rolled-up diameter thereof and acts controllingly on a valve changing the magnitude of the vacuum.

In another embodiment of the present invention, the pull-back device may be influenced by a continuously effective force produced, for example, by a band spring, whereby this force can be varied by the interconnection of a transmission installation functioning as shifting member and having varying force-engaging-arms.

The transmission installation may thereby be constructed as gear having at least two cam wheels or gears.

Accordingly, it is an object of the present invention to provide a belt wind-up mechanism for safety belts which avoids by simple means the aforementioned shortcomings and drawbacks encountered in the prior art.

Another object of the present invention resides in a belt-roll-up mechanism for a safety belt in a motor vehicle in which the discomforts caused by the pressure on the body of the belt user with a fastened belt are minimized.

A further object of the present invention resides in a safety belt roll-up mechanism which permits a maximum degree in freedom of movement on the part of the belt user.

Still a further object of the present invention resides in a belt winding-up mechanism for a safety belt in which the comlete winding-up of the belt is assured after the unfastening of the belt, yet the belt-user's comfort is optimized. These and further objects, features and advantages of the present invention will become more apparent from the following description when taken in connection with the accompanying drawing which shows, for purposes of illustration only, two embodiments in accordance with the present invention, and wherein:

FIG. 1 is a somewhat schematic side elevational view of a belt roll-up mechanism in accordance with the present invention in which the pull-back force is varied by cam gears;

FIG. 2 is a somewhat schematic plan view on the belt roll-up mechanism of FIG. 1;

Figure 3:
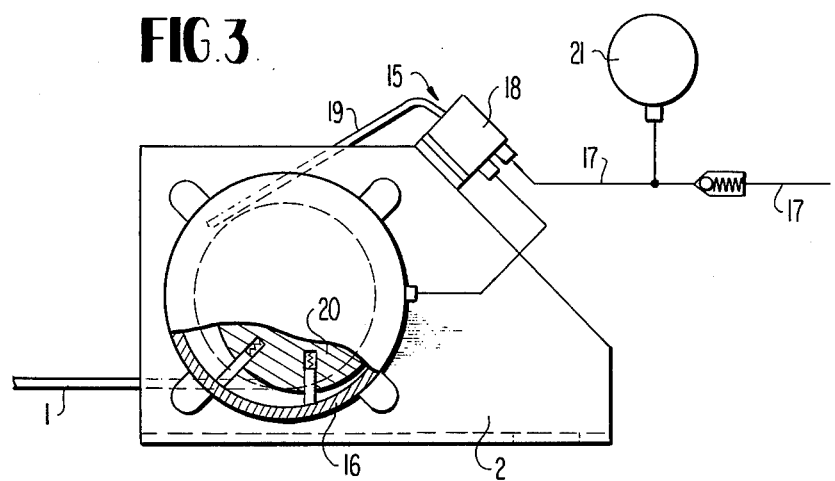
FIG. 3 is a side elevational view, partly in cross section, of a second embodiment of the belt roll-up mechanism in accordance with the present invention equipped with a lamellae motor for producing the pull-back force.

Referring now to the drawing wherein like reference numerals are used throughout the various views to designate like parts, and more particularly to FIGS. 1 and 2, the safety belt 1 illustrated in these two figures in its wound-up or rolled-up position is being received by a belt roller or reel 3 rotatable supported in a housing 2; one end of the belt roller 3 is extended beyond the housing 2 as shaft 4. This free shaft end 4 includes a gear 5 non-rotatable connected thereto for rotation in unison therewith, which meshes with a further gear 6. The gear 6 and a gear 7 coupled therewith are rotatably supported in unison on a pin or shaft 8 projecting from the housing 2. The gear 7 is in meshing engagement with a loose gear 9 i.e., with a gear 9 freely rotatably mounted on the free shaft end 4, whereby the rotatable gear 9 is securely connected with an approximately cam-shaped curved wheel 10 which is in meshing engagement with a further approximately equally constructed and also rotatably supported curved wheel 11. The wheels 10 and 11 are thereby constructed as cam-shaped gears whose radii of curvature are such that they mesh continuously.

A prestressed band spring 12 which serves as pull-back device generally designated by reference numeral 13, is securely connected at its one end with the pin 8 whereas its other end is supported on the cam gear 11 and thus exerts a torque on the cam gear 11 in the clockwise direction as viewed in FIG. 1. Since in the starting position, the effective radius of the cam gear 11 is small, a relatively large force is initially required for pulling out the safety belt 1 which decreases with an increasing pulled-out length—by reason of the gradually increasing, effective radius of the cam gear 11. The pairing of the cam gears 10 and 11 thus represents a transmission installation 14 which acts as shifting member generally designated by reference numeral 15. The gears 5, 6, 7 and 9 operate in that connection exclusively as speed reduction transmission which could be equally replaced by a planetary gear. Similarly, it would be possible to replace the two cam wheels 10 and 11 which in the illustrated embodiment are constructed as gear wheels, by elliptical wheels, or to construct the shifting member 15 as conventional lever installation, by means of which the force of a prestressed spring is variable corresponding to the desired pull-out force.

Figure 4:
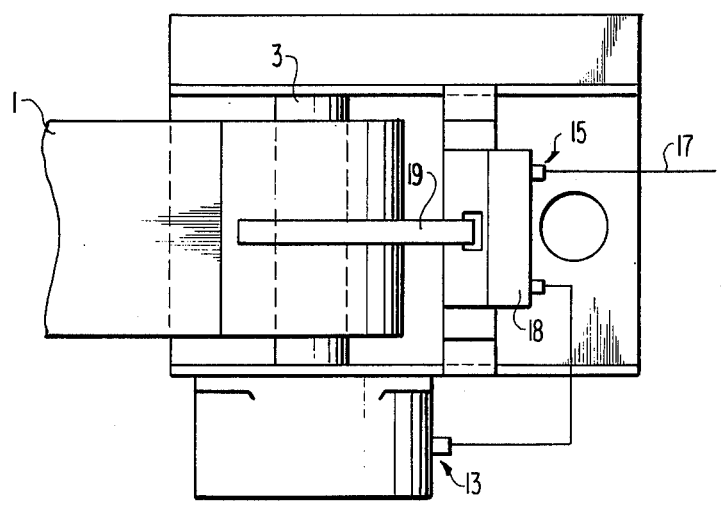
FIG. 4 is a somewhat schematic plan view on the belt roll-up mechanism of FIG. 3.

In the embodiment according to FIGS. 3 and 4, the pull-back device generally designated by reference numeral 13 represents a lamellae motor 16 of conventional construction, in whose supply line 17 is interconnected a value 18 of conventional construction and therefore not illustrated in detail, whereby a sensing device 19 is provided as shifting member 15, which senses or detects the respective diameter of the rolled-up safety belt 1.

The rotor 20 of the lamellae motor 16 may be acted upon, for example, by the vacuum produced by an internal combustion engine. The magnitude of the vacuum in the shifting member 15 is thereby modulated in dependence on the respective pull-out condition of the safety belt 1. In order that a completely satisfactory winding-up or rolling-up of the belt takes place after the disengagement or loosening of the belt and with a turned-off internal combustion engine, it is appropriate if a storage device or reservoir 21 is provided in the feed line 17 which is separated from the suction pipe 23 of an internal combustion engine (not shown) by a check valve 22.

While I have shown and described only two embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What is claimed is:

1. A belt roll-up mechanism for a safety belt means in a vehicle, comprising a pull-back means effective at least during the driving operation for acting upon the safety belt means and shifting means for controlling the value of the pull-out force developed by the pull-back means, said shifting means including two axially parallel disposed cam wheels in slip-free engagement with each other, each cam wheel hving an effective lever arm, said shifting means varying the effective lever arms of said cam wheels over the entire pulled-out range of the safety belt means for controlling the pull-out force.

2. A belt roll-up mechanism according to claim 1, wherein said shifting means varies the effective lever arms of said cam wheels over the entire pulled-out range of the safety belt means for maintaining the pull-out force at a constant value.

3. A belt roll-up mechanism according to claim 2, characterized in that the continuously effective force is supplied by a band spring.

4. A belt roll-up mechanism according to claim 3, characterized in that the cam wheels are cam-shaped gears in continuous meshing engagement with one another.

5. A belt roll-up mechanism according to claim 1, wherein said shifting means varies the effective lever arms of said cam wheels over the entire pulled-out range of the safety belt means to provide a pull-out force whose value decreases with an increasing pull-out length of the safety belt means.

6. A belt roll-up mechanism according to claim 5, characterized in that the continuously effective force is supplied by a band spring.

7. A belt roll-up mechanism according to claim 6, characterized in that the cam wheels are cam-shaped gears in continuous meshing engagement with one another.

8. A belt roll-up mechanism according to claim 5, wherein the maximum value of the pull-out force is equal to the value of the pull-out force at the end of a rolling-up operation.

9. A belt roll-up mechanism according to claim 1, wherein the effective lever arm of each cam wheel is equal to the distance between the axis of each cam wheel and the point of contact with the other cam wheel.

10. A belt roll-up mechanism according to claim 1, wherein said pull-back means is influenced by a force which is effective essentially continuously.

11. A belt roll-up mechanism according to claim 10, characterized in that the continuously effective force is supplied by a band spring.

12. A belt roll-up mechanism according to claim 11, characterized in that the cam wheels are cam-shaped gears in continuous meshing engagement with one another.

* * * * *